(12) United States Patent
Geller

(10) Patent No.: US 6,412,967 B2
(45) Date of Patent: Jul. 2, 2002

(54) PORTABLE LIGHT REFLECTOR OR DIFFUSOR

(76) Inventor: Wolfgang-Peter Geller, Muehlenweg 10, D-21376 Garlstorf (DE)

(*) Notice: Subject to any disclaimer, the term of this patent is extended or adjusted under 35 U.S.C. 154(b) by 0 days.

(21) Appl. No.: 09/753,144

(22) Filed: Jan. 2, 2001

(51) Int. Cl.⁷ ............................................... G03B 15/06
(52) U.S. Cl. ........................ 362/18; 362/16; 362/352; 362/358
(58) Field of Search ........................ 362/16, 18, 341, 362/349, 352, 355, 357, 358

(56) References Cited

U.S. PATENT DOCUMENTS 4,233,647 A * 11/1980 Andersen ..................... 362/16
6,234,638 B1 * 5/2001 Beverly ....................... 362/16

FOREIGN PATENT DOCUMENTS

EP 0597199 5/1994

* cited by examiner

*Primary Examiner*—Sandra O'Shea
*Assistant Examiner*—Hargobind S. Sawhney
(74) *Attorney, Agent, or Firm*—Friedrich Kueffner

(57) ABSTRACT

A portable light reflector or diffusor includes a reflection or diffusion cloth attached to a foldable framework composed of longitudinal struts and a transverse strut which is stiff with respect to compression and connects the two longitudinal struts, wherein the transverse strut has ends bent in the direction towards the plane defined by the longitudinal struts and the reflection or diffusion cloth attached to the longitudinal struts, wherein the angle between the bent ends and the intermediate piece between the ends is greater than 90°. A belt extends parallel to the transverse strut in such a way that the longitudinal struts are pressed apart for tensioning the reflection or diffusion cloth.

10 Claims, 2 Drawing Sheets

PORTABLE LIGHT REFLECTOR OR DIFFUSOR

BACKGROUND OF THE INVENTION

1. Field of the Invention

The present invention relates to a portable light reflector or diffusor which includes a reflection or diffusion cloth or fabric attached to a foldable framework. The framework is composed of two longitudinal struts and a transverse strut which is stiff with respect to compression and connects the two longitudinal struts. The transverse strut is at its end bent towards the plane defined by the longitudinal struts and the reflection or diffusion cloth or fabric attached to the longitudinal struts, wherein the angle between the respective ends of the transverse strut and the connecting piece between the ends is greater than 90°.

2. Description of the Related Art

A light reflector of the above-described type is disclosed in EP 0 579 199 B1. This known light reflector includes a stable framework which is formed by two longitudinal struts and at least two transverse struts. This light reflector is held together and tensioned by the spring tension of the reflection cloth or fabric which is made of an appropriately spring-elastic material. This known light reflector forms a three-dimensional framework which is tensioned and held together by the spring force which is inherent in the reflection cloth or fabric.

German utility model 1 991 505 discloses a lampshade which includes a tensioning strap 23 for mounting the lampshade on a circular frame.

SUMMARY OF THE INVENTION

It is the primary object of the present invention to provide a lighter and simpler light reflector or diffusor of the above-described type.

In accordance with the present invention, a belt extends between the longitudinal struts parallel to the transverse strut in such a way that the longitudinal struts are pressed apart for tensioning the reflection or diffusion cloth or fabric.

The reflection or diffusion cloth or fabric according to the present invention is not of a spring-elastic material, but a conventional cloth or fabric which is not spring-elastic. The cloth or fabric is tensioned by means of the belt which can be tensioned or shortened until the reflection or diffusion cloth or fabric assumes the desired shape and position. The transverse strut essentially forms a lever around whose ends the longitudinal struts are pivotable, wherein pivoting is carried out by shortening the belt until the reflection or diffusion cloth or fabric assumes the predetermined shape and position. In this manner, a configuration is formed which can be easily folded together and set up, and which is very light and can be manufactured inexpensively.

In accordance with an advantageous feature, the length of the belt can be adjusted for tensioning the cloth or fabric. In accordance with another feature, the transverse strut is mounted at a short distance from one end of each longitudinal strut, wherein the belt is connected to the longitudinal struts at the short sides thereof. This ensures that the reflection or diffusion cloth or fabric is located essentially on one side and the transverse strut and the tensioning belt can be easily manipulated.

In accordance with another very advantageous feature, a tripod can be attached to the transverse strut, wherein the tripod is connected through an adjustable support belt to the belt for tensioning the reflection or diffusion cloth or fabric.

In accordance with another feature, the support belt is connected to a clamping sleeve of the tripod. Accordingly, a tripod can be mounted at that end of the light reflector or diffusor at which the transverse strut and the tensioning belt are located, so that the light reflector or diffusor can also be mounted in an overhead position or any other desired position. This is of particular interest in movie production where the light reflector or diffusor must be mounted invisibly above the actors.

The various features of novelty which characterize the invention are pointed out with particularity in the claims annexed to and forming a part of the disclosure. For a better understanding of the invention, its operating advantages, specific objects attained by its use, reference should be had to the drawing and descriptive matter in which there are illustrated and described preferred embodiments of the invention

DESCRIPTION OF THE PREFERRED EMBODIMENTS

Figure 1:
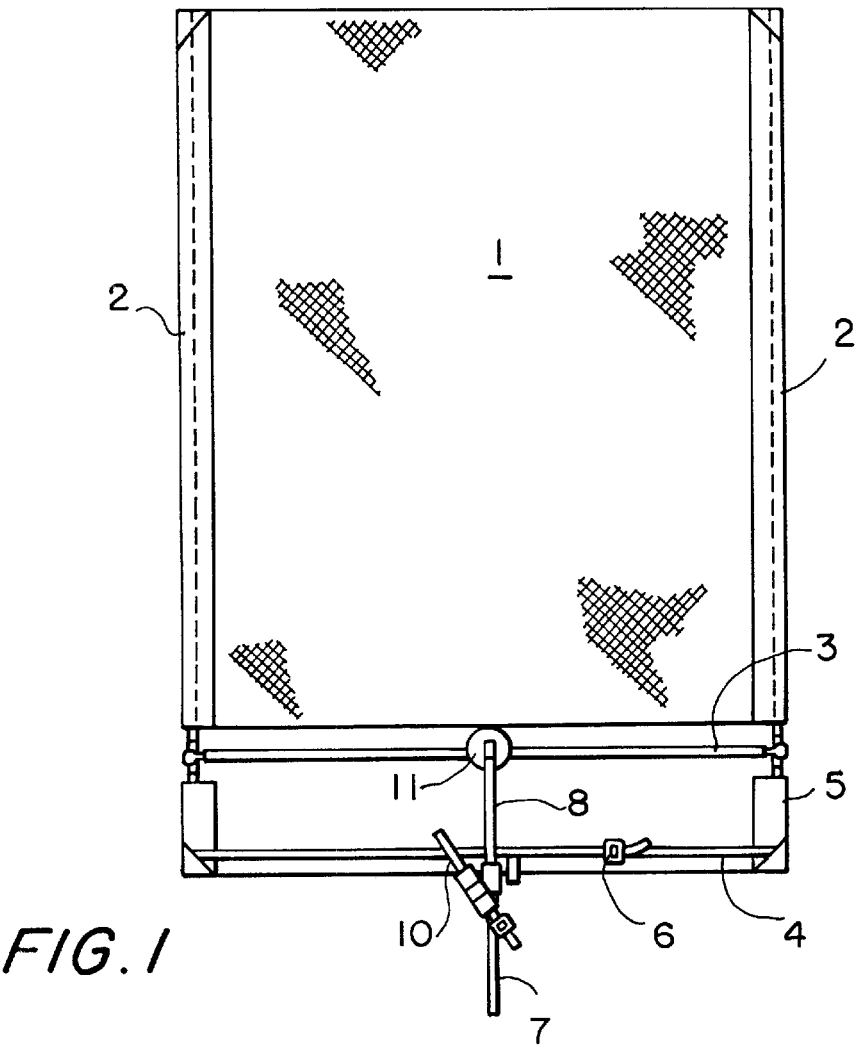
FIG. 1 is a top view of an embodiment of a mounted light reflector or diffusor in accordance with the present invention.
Figure 2:
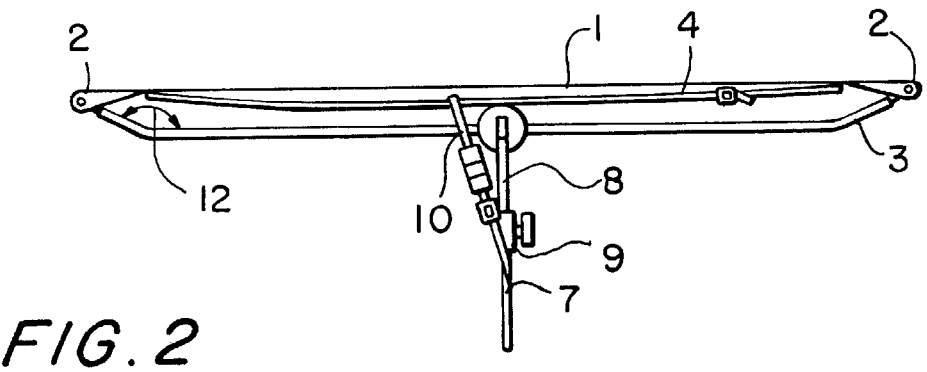
FIG. 2 is a side view of the light reflector or diffusor of FIG. 1.

The light reflector or diffusor illustrated in the drawing is composed of a reflection or diffusion cloth 1 of a stiff textile material. This reflection or diffusion cloth is connected to two parallel longitudinal struts 2 by means of appropriate sleeves formed in longitudinal direction of the cloth. Mounted near one end of each longitudinal strut 2 is a transverse strut 3 which is shaped as illustrated particularly in FIG. 2. Thus, the transverse strut 3 has bent ends and the intermediate piece of the transverse strut between the ends is located outside of the plane of the reflection or diffusion cloth 1, so that a three-dimensional framework is formed. The angle 12 between the ends of the transverse strut 3 and the middle piece is greater than 90°.

The reflection or diffusion cloth is tensioned by means of a belt 4 connected to reinforced sleeves 5 of the cloth 1 placed over the short sides of the longitudinal struts 2. The length of the belt 4 is adjustable by a buckle 6. It can be easily seen that when the belt 4 is shortened, the transverse strut 3 acts as a lever around whose ends the longitudinal struts 2 can be slightly pivoted until the reflection or diffusion cloth 1 assumes the desired tensioned position.

The light reflector or diffusor can be easily set up or folded together. The light reflector or diffusor has a light weight and, thus, can be easily manipulated.

The light reflector or diffusor can also be mounted on a tripod which is composed of a tripod tube 7 with a telescopic extension 8 which can be connected to each other and locked through a clamping sleeve 9. The tripod is attached to the transverse strut 3 through a clamping device 11. For ensuring additional stability and assuming the desired three-dimensional position, a support belt 10 is provided which extends between the clamping sleeve 9 and the belt 4 for tensioning the reflection or diffusion cloth 1.

Figure 3:
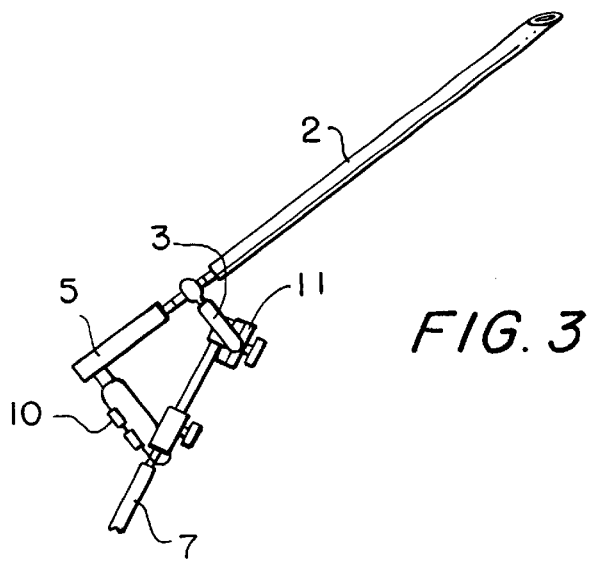
FIG. 3 is a side view from the other side of the illustration of FIG. 1, wherein the light reflector or diffusor assumes an upwardly directed oblique position.
Figure 4:
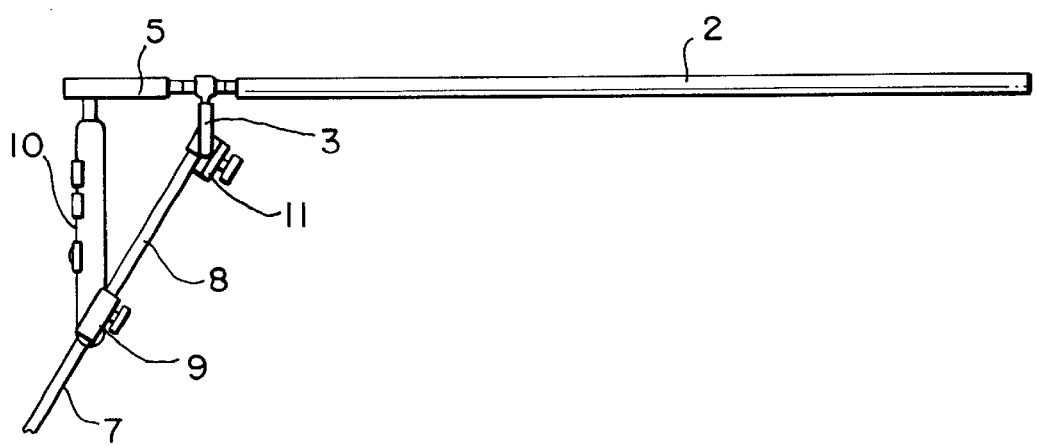
FIG. 4 is a view corresponding to FIG. 3, however, with the light reflector or diffusor mounted horizontally.

Using the tripod, the light reflector or diffusor can assume different positions, particularly overhead positions, as they are illustrated in FIGS. 3 and 4. It can be seen that by shortening the support belt 10, the light reflector or diffusor has assumed in FIG. 3 a different position than in FIG. 4.

While specific embodiments of the invention have been shown and described in detail to illustrate the inventive principles, it will be understood that the invention may be embodied otherwise without departing from such principles.

I claim:

1. A portable light reflector comprising a foldable framework comprised of two longitudinal struts and a transverse strut which is stiff with respect to compression and connects the two longitudinal struts, and a reflection cloth attached to the two longitudinal struts, wherein the transverse strut has ends bent in a direction towards a plane defined by the longitudinal struts and the reflection cloth attached to the longitudinal struts, wherein each of the bent ends defines with a connecting piece of the transverse strut between the ends an angle greater than 90°, further comprising a belt adjustably extending parallel to the transverse strut and connected to the longitudinal struts, such that the longitudinal struts are pressed apart for tensioning the reflection cloth.

2. The light reflector according to claim 1, wherein the belt has an adjustable length for tensioning the reflection cloth.

3. The light reflector according to claim 1, wherein the transverse strut is attached near an end of each longitudinal strut forming short sides of the longitudinal struts, wherein the belt is connected to the short sides of the longitudinal struts.

4. The light reflector according to claim 1, further comprising a tripod attached to the transverse strut, wherein the tripod has an adjustable support belt connected to the belt for tensioning the reflection cloth.

5. The light reflector according to claim 4, wherein the support belt is connected to a clamping sleeve of the tripod.

6. A portable light diffusor comprising a foldable framework comprised of two longitudinal struts and a transverse strut which is stiff with respect to compression and connects the two longitudinal struts, and a diffusor cloth attached to the two longitudinal struts, wherein the transverse strut has ends bent in a direction towards a plane defined by the longitudinal struts and the diffusor cloth attached to the longitudinal struts, wherein each of the bent ends defines with a connecting piece of the transverse strut between the ends an angle greater than 90°, further comprising a belt adjustable extending parallel to the transverse strut and connected to the longitudinal struts, such that the longitudinal struts are pressed apart for tensioning the diffusor cloth.

7. The light diffusor according to claim 6, wherein the belt has an adjustable length for tensioning the diffusor cloth.

8. The light diffusor according to claim 6, wherein the transverse strut is attached near an end of each longitudinal strut forming short sides of the longitudinal struts, wherein the belt is connected to the short sides of the longitudinal struts.

9. The light diffusor according to claim 6, further comprising a tripod attached to the transverse strut, wherein the tripod has an adjustable support belt connected to the belt for tensioning the diffusor cloth.

10. The light diffusor according to claim 9, wherein the support belt is connected to a clamping sleeve of the tripod.

\* \* \* \* \*